April 29, 1924.
E. J. RAY
1,492,266
MECHANICAL MOVEMENT
Filed June 22, 1918
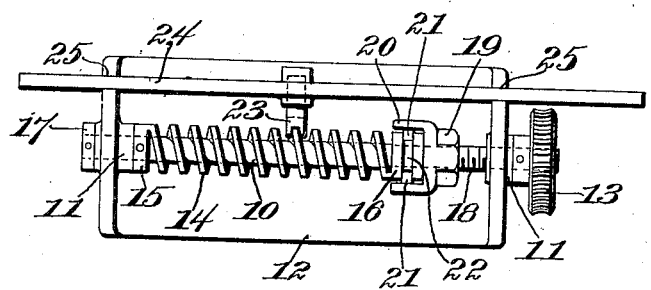
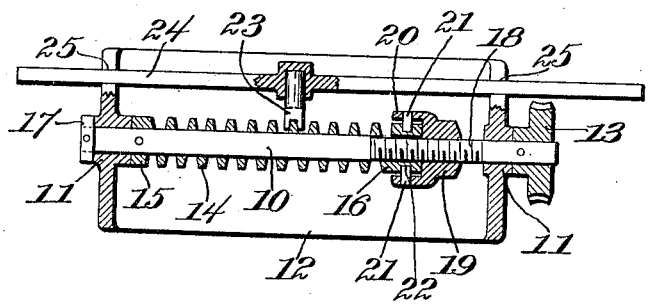
Witness
Jas. J. Maloney.
Inventor
Eugene J. Ray
by Van Everen Fish & Hildreth
Attys Patented Apr. 29, 1924.

1,492,266

UNITED STATES PATENT OFFICE.

EUGENE J. RAY, OF BEVERLY, MASSACHUSETTS, ASSIGNOR TO UNITED SHOE MACHINERY CORPORATION, OF PATERSON, NEW JERSEY, A CORPORATION OF NEW JERSEY.

MECHANICAL MOVEMENT.

Application filed June 22, 1918. Serial No. 241,319.

*To all whom it may concern:*

Be it known that I, EUGENE J. RAY, a citizen of the United States, residing at Beverly, in the county of Essex and State of Massachusetts, have invented certain new and useful Improvements in Mechanical Movements; and I do hereby declare the following to be a full, clear, and exact description of the invention such as will enable others skilled in the art to which it appertains to make and use the same.

This invention relates to mechanical movements, and more particularly to a mechanism adapted to secure a variable spacing or feeding movement.

It is the object of the invention to provide novel and simple means for transmitting a variable movement from a rotary shaft, and to this end the invention comprises a flexible worm, the pitch of which may be varied, and a worm rack adapted to be engaged by the worm. The invention also includes other features referred to in the claims.

Referring to the accompanying drawings, Figure 1 is a view in elevation, illustrating one of the simplest embodiments of the invention, and Fig. 2 is a longitudinal section thereof.

In the drawings, 10 is a shaft journaled in bearings 11 on a frame 12 and adapted to be driven, either continuously or intermittently, by any suitable means, not herein shown or described. As indicated at 13, however, worm gearing may be the medium through which the desired motion is finally transmitted to the driven shaft. Mounted on the driven shaft is the element which has been referred to as the flexible worm, consisting of a series of spiral convolutions, having in cross section the form and relation to the shaft of a worm tooth. This element is designated by the numeral 14, and is essentially the same as an ordinary worm from which the solid central portion has been entirely cut away, so as to leave the thread intact, and in the form of a spiral spring. The flexible worm 14 preferably terminates, at one end, in a collar 15 pinned to the shaft, and at the opposite end, in a collar 16 which, together with the intervening spiral convolutions of the worm, is longitudinally movable on the shaft to an extent determined by its range of flexibility. Endwise movement of the shaft is prevented by the worm collar 15 and a fixed collar 17 on the shaft which are adjacent opposite ends of the same bearing. The shaft 10 is threaded at 18 to receive a nut 19 adjustable on the shaft to compress or expand the worm for the purpose of varying its pitch. Provision may be made for stretching the worm beyond the limit of its normally expanded condition by forming on the nut 19 a laterally extending annular flange 20 which surrounds the adjacent collar 16 of the worm and carries a pin 21 which projects into an annular groove 22 in the said collar.

The action of the worm under the influence of the adjusting nut is similar to the action of a spiral spring, the coils of which when compressed or expanded, move toward or away from each other equally throughout the length of the spring. Accordingly it will be seen that the pitch of the worm will be constant, from end to end, under all conditions of adjustment.

The worm meshes with a single tooth space in a worm-rack 23 swiveled in a slide bar 24 mounted for longitudinal movement in slide bearings 25 on the frame 12. Rotation of the worm acts to feed the slide bar by a worm and rack movement.

By adjusting the pitch of the worm the motion imparted to the slide bar may be varied. As the pitch of the worm is varied, the worm rack, because of its swiveled connection with the slide bar, may adjust itself readily to the changed angle of the worm tooth. If the rotation of the worm shaft is continuous, a variable continuous motion will be imparted to the slide bar, while if the worm shaft is intermittently rotated, the motion imparted to the slide bar will be a variable step-by-step movement. These movements may be utilized for feeding or spacing work to be operated upon by other mechanism, or for various other purposes.

Having thus explained the nature of the invention, what is claimed is:—

1. A mechanical movement comprising a variable pitch worm, a slide, a worm rack tooth on said slide in mesh with said worm, means for changing the pitch of said worm to vary the movement of said slide, and means permitting variation in the pitch of said tooth relatively to said slide.

2. A mechanical movement comprising a variable pitch worm, a slide, a worm rack pivoted on said slide and provided with a tooth space in mesh with said worm, and means for adjusting the pitch of said worm to vary the movement of said slide.

3. A mechanical movement comprising, in combination, a shaft, a variable pitch worm on said shaft and revoluble therewith, a member having a tooth space engaging the worm, the shaft and member being mounted for relative rectilinear movement lengthwise of the shaft, and means for adjusting the pitch of said worm to vary the relative movement.

4. A mechanical movement comprising, in combination, a shaft, a spiral spring on said shaft revoluble therewith, a member operatively engaged by said spring to cause relative rectilinear movement between the shaft and member lengthwise of the shaft, and means for adjusting the pitch of the spring to vary said relative movement.

5. A mechanical movement comprising, in combination, a shaft, a flexible worm having a plurality of convolutions and having one end fixed to said shaft, a sliding rack engaged by said worm, and a nut adjustable on the shaft to compress and stretch said worm to vary the movement of said rack.

6. A mechanical movement comprising, in combination, a shaft, a flexible spring worm having one end fixed to said shaft, a slide bar, a worm rack swiveled in said slide bar and operatively engaged by said worm, and a nut adjustable on said shaft to vary the compression of said worm, and operatively connected to stretch said worm beyond the limit of its normal expansion to control the movement of said slide bar.

7. A mechanical movement comprising a shaft, a variable pitched worm on the shaft having a plurality of convolutions, a member engaging the worm and constructed to permit variations in its pitch, and means for adjusting the pitch of the worm to vary the relative movement lengthwise of the shaft between the said member and shaft.

8. A mechanical movement comprising a spiral spring worm having a plurality of convolutions and free to expand and contract axially throughout its length, means for expanding and contracting the worm to vary its pitch, and a toothed member engaged by the worm constructed to permit variation in the pitch of the worm to vary the relative axial movement between the member and the form.

EUGENE J. RAY.